US012246570B2

(12) United States Patent
Sieve

(10) Patent No.: US 12,246,570 B2
(45) Date of Patent: Mar. 11, 2025

(54) HEIGHT-ADJUSTABLE AGRICULTURAL VEHICLES AND METHODS OF TRANSFERRING LOADS THEREIN

(71) Applicant: AGCO Corporation, Duluth, GA (US)

(72) Inventor: Jason Darwin Sieve, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 18/575,933

(22) PCT Filed: Jul. 7, 2022

(86) PCT No.: PCT/IB2022/056297
§ 371 (c)(1),
(2) Date: Jan. 2, 2024

(87) PCT Pub. No.: WO2023/285932
PCT Pub. Date: Jan. 19, 2023

(65) Prior Publication Data
US 2024/0308290 A1 Sep. 19, 2024

Related U.S. Application Data

(60) Provisional application No. 63/221,593, filed on Jul. 14, 2021.

(51) Int. Cl.
*B60G 17/018* (2006.01)
*B60G 3/01* (2006.01)
(Continued)

(52) U.S. Cl.
CPC ......... *B60G 17/018* (2013.01); *B60G 17/016* (2013.01); *B60G 17/017* (2013.01);
(Continued)

(58) Field of Classification Search
CPC .............. B60G 17/018; B60G 2300/08; B60G 2400/60; B60G 2800/214; B60G 17/016;
(Continued)

(56) References Cited

U.S. PATENT DOCUMENTS 1,984,694 A * 12/1934 Nottoli ................... B60G 11/04
267/68
2,299,241 A * 10/1942 Kumm ..................... B60G 3/01
267/254
(Continued)

FOREIGN PATENT DOCUMENTS

DE 102007027513 A1 12/2008
EP 2248690 A2 11/2010
(Continued)

OTHER PUBLICATIONS

UK Intellectual Property Office, Search Report for GB Application No. GB2110750.3, dated Apr. 25, 2022, 3 pages.
(Continued)

*Primary Examiner* — Timothy Wilhelm

(57) ABSTRACT

An agricultural vehicle includes a chassis, a plurality of ground-engaging elements configured to support the chassis above a ground surface, and a plurality of support assemblies supporting the chassis on the ground-engaging elements. Each support assembly includes a height-adjustment actuator. A controller is configured to adjust the height-adjustment actuators independently of one another and transfer a load from a first ground-engaging element to other ground-engaging elements. A method of operating an agricultural vehicle includes receiving a command to transfer a load from a first ground-engaging element to other ground-engaging elements, adjusting at least one height-adjustment actuator, and transferring a load from the first ground-engaging element to the other ground-engaging elements.

11 Claims, 12 Drawing Sheets

(51) Int. Cl.
*B60G 17/016* (2006.01)
*B60G 17/017* (2006.01)
*B62D 49/06* (2006.01)

(52) U.S. Cl.
CPC ............ *B60G 3/01* (2013.01); *B60G 2300/08* (2013.01); *B60G 2400/60* (2013.01); *B60G 2400/64* (2013.01); *B60G 2800/214* (2013.01); *B62D 49/0678* (2013.01)

(58) Field of Classification Search
CPC .... B60G 17/017; B60G 3/01; B60G 2400/64; B62D 49/0678
See application file for complete search history.

(56) References Cited

U.S. PATENT DOCUMENTS

| | | | | |
|---|---|---|---|---|
| 3,558,148 A * | 1/1971 | Johnson | ............... | A61K 9/0019 280/6.155 |
| 4,036,304 A * | 7/1977 | Crow, Jr. | ............... | B62D 61/10 172/260 |
| 4,071,277 A * | 1/1978 | Stedman | ................... | B60P 1/16 280/124.109 |
| 4,241,803 A * | 12/1980 | Lauber | ................... | B60P 3/40 280/765.1 |
| 4,468,050 A * | 8/1984 | Woods | ............... | B60G 17/0155 280/DIG. 1 |
| 4,534,575 A * | 8/1985 | Grove | ................... | B60G 21/026 180/41 |
| 5,580,089 A * | 12/1996 | Kolka | ................... | B62D 9/02 280/5.521 |
| 6,036,201 A * | 3/2000 | Pond | ................... | B60G 15/12 280/5.514 |
| 6,311,795 B1 * | 11/2001 | Skotnikov | .......... | B60G 17/0152 280/6.154 |
| 6,371,237 B1 * | 4/2002 | Schaffer | ................... | B62D 7/06 280/124.17 |
| 6,474,672 B1 * | 11/2002 | Briscese | ............... | B60G 3/00 280/43.23 |
| 6,491,306 B2 * | 12/2002 | Schaffer | ................... | B60G 3/01 280/5.506 |
| 6,845,830 B2 * | 1/2005 | Tojo | ................... | B62D 61/12 280/DIG. 10 |
| 7,168,717 B2 * | 1/2007 | Wubben | .............. | B60B 35/1054 280/124.157 |
| 7,281,723 B2 * | 10/2007 | Prohaska | ............... | B60G 11/27 180/209 |
| 7,284,764 B2 * | 10/2007 | Prohaska | ................... | B60G 11/27 280/124.157 |
| 7,571,044 B2 * | 8/2009 | Brown | ............... | B60G 17/0165 701/91 |
| 7,574,926 B2 * | 8/2009 | Anderson | ............... | A01D 46/08 73/862.325 |
| 7,837,207 B2 * | 11/2010 | Kremmin | ................. | B60G 3/01 280/5.514 |
| 7,950,675 B1 * | 5/2011 | Quenzi | ................... | B60P 1/027 180/209 |
| 8,042,817 B2 * | 10/2011 | Motebennur | ............ | B60G 9/00 280/6.154 |
| 8,205,893 B2 * | 6/2012 | Peterson | ............ | B62D 49/0607 280/6.157 |
| 8,376,078 B2 * | 2/2013 | Hiddema | .............. | B60B 35/001 180/209 |
| 8,424,881 B2 * | 4/2013 | Vander Zaag | ........... | B60G 3/01 280/43.17 |
| 8,437,911 B2 * | 5/2013 | Lanzilotta | .......... | B60G 17/0424 701/37 |
| 8,534,686 B1 * | 9/2013 | Slawson | ................... | B62D 7/06 280/124.147 |
| 8,602,137 B2 * | 12/2013 | Kroese | ................... | B60G 11/28 180/41 |
| 8,840,118 B1 * | 9/2014 | Giovanardi | ......... | F15B 13/0444 280/124.157 |
| 9,180,747 B2 | 11/2015 | Slawson | | |
| 9,278,594 B2 * | 3/2016 | Horsch | ................... | B62D 7/06 |
| 9,296,273 B2 * | 3/2016 | Slawson | ................ | B60G 15/12 |
| 9,481,415 B2 * | 11/2016 | Clayton | ............... | B60G 17/015 |
| 9,533,540 B2 * | 1/2017 | Lindsay | ................ | B62D 61/12 |
| 9,890,024 B2 * | 2/2018 | Hao | ................... | B60G 21/007 |
| 10,384,537 B2 * | 8/2019 | Flogård | ................ | B60W 10/22 |
| 11,007,838 B2 * | 5/2021 | Bowden | ................ | B66F 11/044 |
| 11,446,996 B2 * | 9/2022 | Gaither | ................ | B60G 17/015 |
| 11,718,139 B2 * | 8/2023 | Han | ...................... | B60G 3/185 280/5.507 |
| 11,730,073 B2 * | 8/2023 | Crowley | ............ | B62D 49/0678 280/638 |
| 2005/0132686 A1 * | 6/2005 | Anderson | .............. | A01D 46/08 56/28 |
| 2008/0077293 A1 * | 3/2008 | Fitzgibbons | ....... | B60G 17/0185 280/5.514 |
| 2015/0102593 A1 | 4/2015 | Slawson | | |
| 2017/0361707 A1 * | 12/2017 | Flogård | .............. | B60K 23/0808 |
| 2019/0359025 A1 * | 11/2019 | Wager | .................. | B60G 21/005 |
| 2020/0130741 A1 | 4/2020 | Crowley et al. | | |
| 2022/0042280 A1 | 2/2022 | Tamai et al. | | |
| 2023/0415535 A1 * | 12/2023 | Mistry | ................... | B60W 10/22 |
| 2024/0001728 A1 * | 1/2024 | Ali | ...................... | B60G 17/0165 |
| 2024/0010041 A1 * | 1/2024 | Mistry | ................... | B60G 17/0195 |
| 2024/0043073 A1 * | 2/2024 | Prashant Rao | .... | B62D 49/0678 |
| 2024/0059119 A1 * | 2/2024 | Ali | ...................... | B60G 17/0165 |

FOREIGN PATENT DOCUMENTS

| | | |
|---|---|---|
| WO | 8900928 A1 | 2/1989 |
| WO | 2010020607 A1 | 2/2010 |
| WO | WO-2020246929 A1 * | 12/2020 |

OTHER PUBLICATIONS

European Patent Office, Search Report for PCT Application No. PCT/IB2022/056297, dated Oct. 24, 2022, 12 pages.

* cited by examiner

HEIGHT-ADJUSTABLE AGRICULTURAL VEHICLES AND METHODS OF TRANSFERRING LOADS THEREIN

CROSS-REFERENCE TO RELATED APPLICATION

This application is a national phase entry under 35 U.S.C. § 371 of International Patent Application PCT/IB2022/056297, filed Jul. 7 2022, designating the United States of America and published in English as International Patent Publication WO 2023/285932 A1 on Jan. 19, 2023, which claims the benefit of the filing date of U.S. Provisional Patent Application No. 63/221,593, "Height-Adjustable Agricultural Vehicles and Methods of Transferring Loads Therein," filed Jul. 14, 2021, the entire disclosure of which is incorporated herein by reference.

FIELD

Embodiments of the present disclosure relate to mobile machines, such as self-propelled agricultural machines and similar vehicles. More particularly, embodiments relate to mobile machines with an adjustable-height chassis.

BACKGROUND

Some agricultural vehicles are configured to be operated in fields among row crops. Application machines such as self-propelled sprayers, for example, may have wheels configured to pass between crop rows and a spray boom that extends outwardly from the vehicle to spray the crop as the machine travels through the field. To avoid damaging the crops as the vehicle moves through the field, each of the wheels must have the proper width to travel between the rows, and the track width—the lateral distance between the wheels-must match row spacing so that the wheels are properly positioned between crop rows. Furthermore, the vehicle should have sufficient ground clearance (the distance between the vehicle body and the surface over which it moves) to clear the crops.

U.S. Pat. No. 9,180,747, "System and Method of Adjusting the Chassis Height of a Machine," granted Nov. 10, 2015, discloses a self-propelled sprayer having a chassis-height adjustment system wherein four wheel support assemblies are configured to selectively raise and lower the chassis relative to the ground surface by actuators. Adjustment of the chassis height in such known systems is commanded by an operator through user interface elements. The operator may thus raise and lower the chassis as required. For example, during filling, on the highway, or in crop fields with short crops, a low ground clearance may be selected. Conversely, for operating in taller crops, a higher ground clearance may be selected. In general, during operation in crop fields, selecting the lowest possible chassis height that avoids damaging the crop canopy is desirable to maintain the center of mass as low as possible for stability.

BRIEF SUMMARY

In some embodiments, an agricultural vehicle includes a chassis, a plurality of ground-engaging elements configured to support the chassis above a ground surface, and a plurality of support assemblies supporting the chassis on the ground-engaging elements. Each support assembly includes a height-adjustment actuator. A controller is configured to adjust the height-adjustment actuators independently of one another and transfer a load from a first ground-engaging element to other ground-engaging elements.

A method of operating an agricultural vehicle includes receiving a command to transfer a load from a first ground-engaging element to other ground-engaging elements, adjusting at least one height-adjustment actuator, and transferring a load from the first ground-engaging element to the other ground-engaging elements.

In some embodiments, a method includes receiving a command to lift a first ground-engaging element, adjusting at least one height-adjustment actuator, and raising the first ground-engaging element above the ground surface while the chassis is supported by other ground-engaging elements.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figure 1:
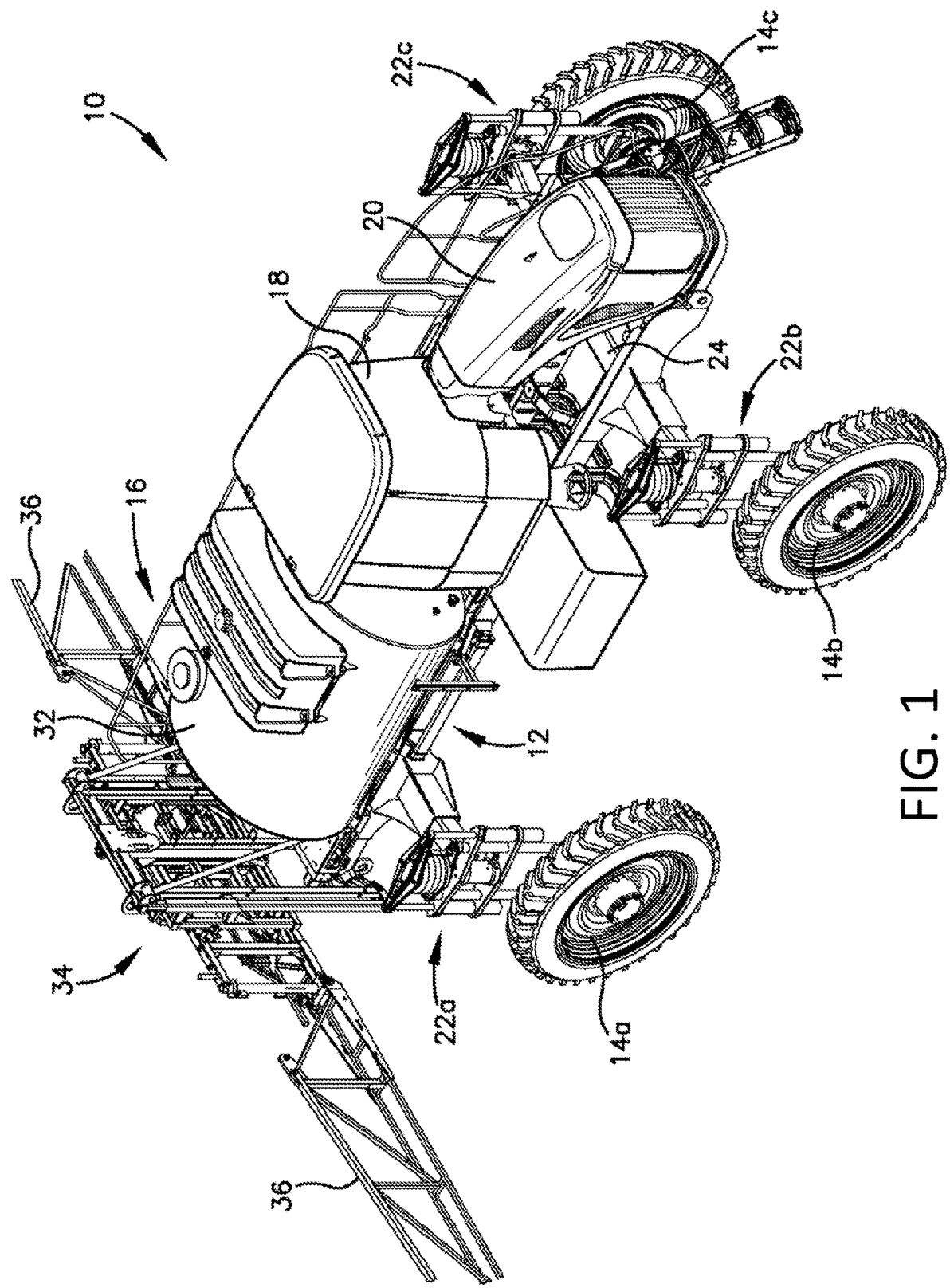
FIG. 1 is a perspective view of an agricultural applicator constructed in accordance with principles disclosed herein.
Figure 2:
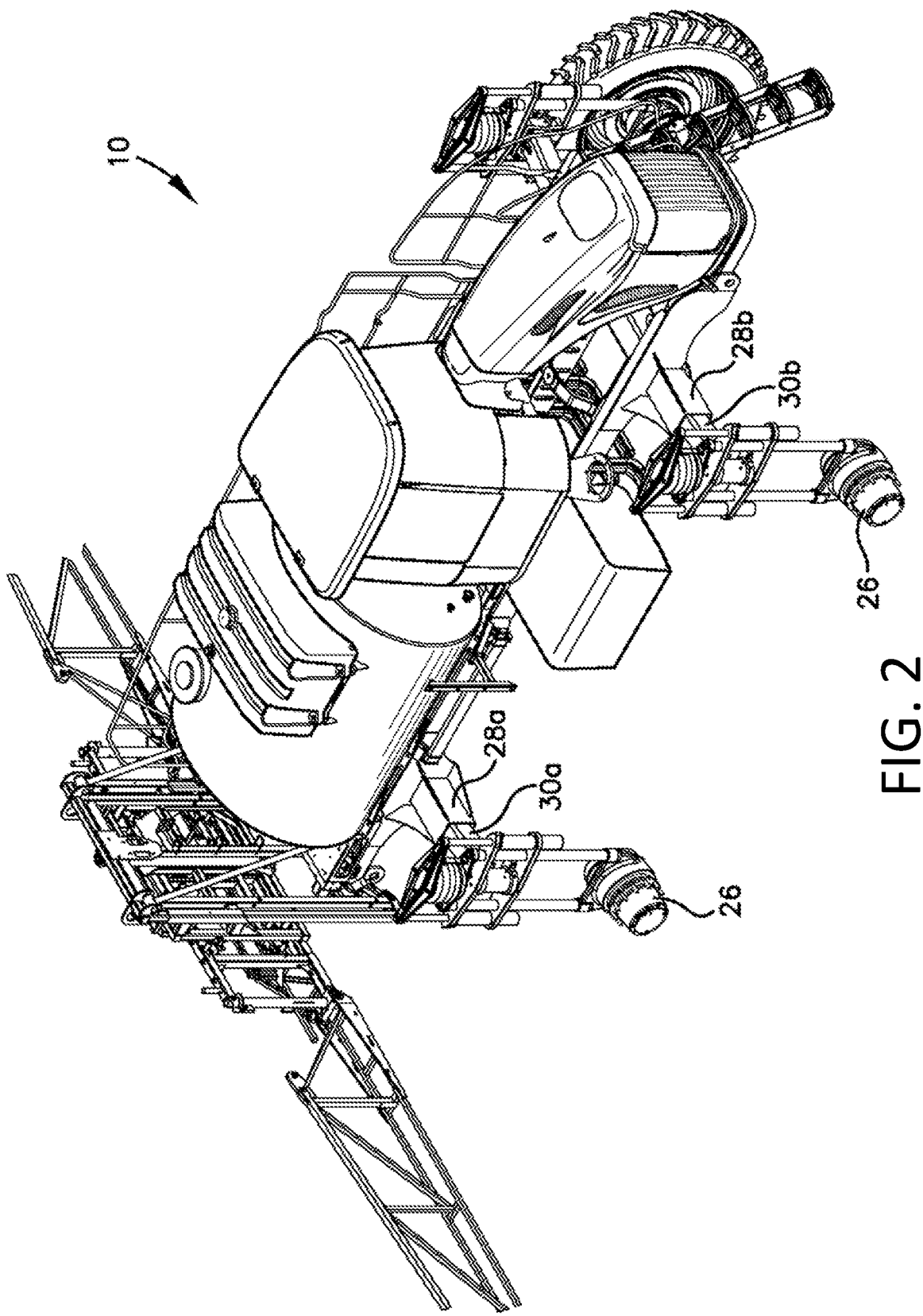
FIG. 2 is a perspective view of the agricultural applicator of FIG. 1 with two of the wheels omitted to more fully illustrate support assemblies interposed between the wheels and the chassis.
Figure 3:
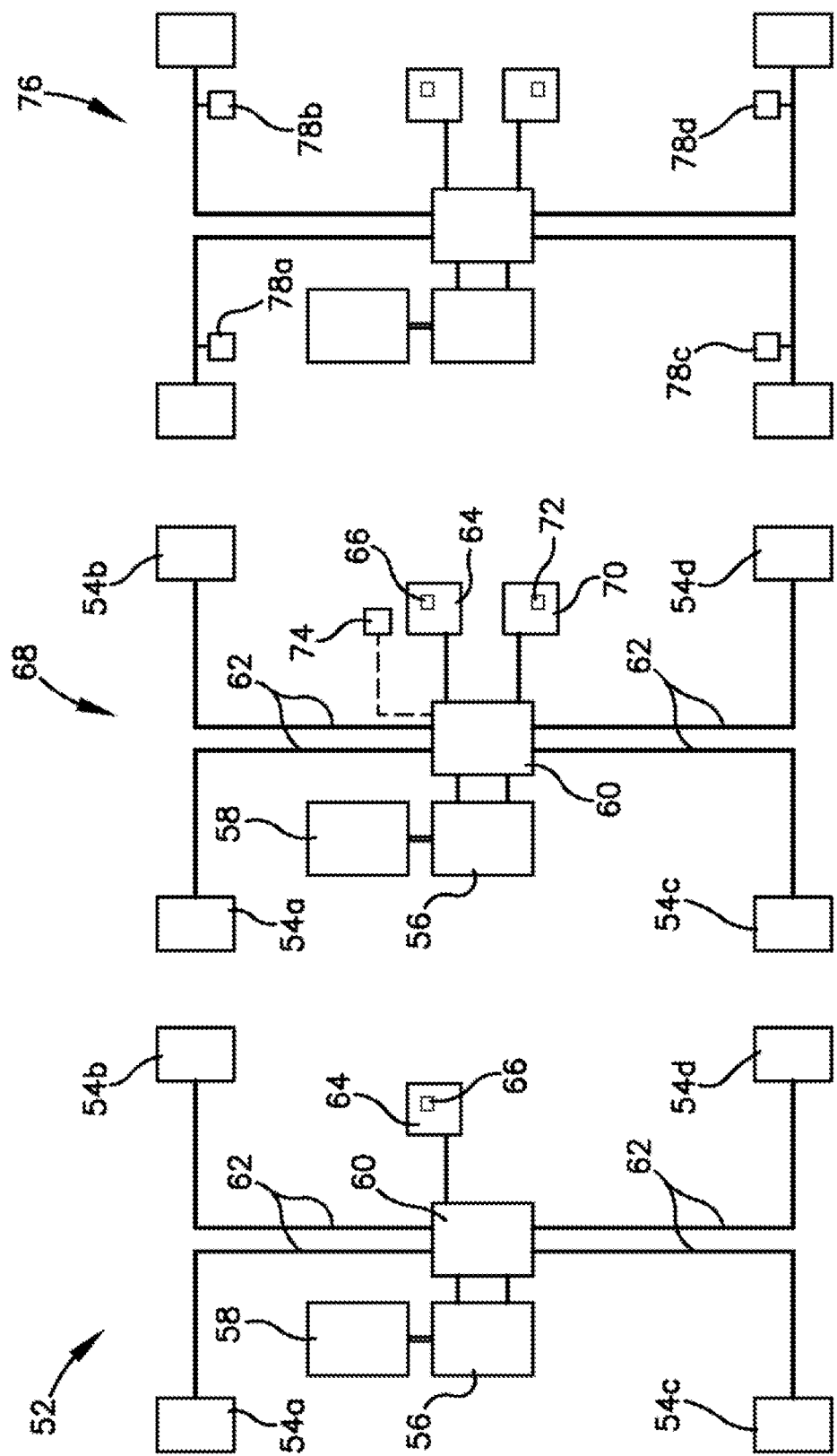
FIGS. 3A-3C are block diagrams of various exemplary embodiments of a control system of the applicator of FIG. 1.

The illustrations presented herein are not actual views of any vehicle or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIGS. 1 through 4 illustrate an agricultural vehicle having an adjustable chassis height. In particular, the vehicle is pictured as an applicator 10 including a chassis 12, a plurality of wheels 14 or other ground-engaging elements supporting the chassis 12 above a ground surface, an application system 16, an operator cabin 18, and an engine compartment 20. A plurality of support assemblies 22 interposed between the wheels 14 and the chassis 12 support the chassis 12 on the wheels 14 and provide suspension, height adjustment, and/or steering functions, as discussed in greater detail below.

Certain components of the applicator 10 have been omitted from the figures for simplicity of illustration and to show certain features of the applicator 10 that would otherwise be concealed. The engine, for example, has been omitted to illustrate components of the applicator frame, including portions of the front axle 24. Certain hydraulic lines, such as hydraulic lines running to and from the assemblies 22, are also omitted. The applicator 10 is illustrated and discussed herein as an exemplary machine with which the support assemblies 22 may be used. It will be appreciated by those skilled in the art that the support assemblies 22 may be used with other machines including other types of applicators or other vehicles or mobile machines that would benefit from the advantages of the support assemblies disclosed herein, such as chassis height adjustment, independent suspension, and independent wheel control.

The applicator 10 includes a pair of front wheels 14b, 14c and a pair of rear wheels 14a, 14d (rear wheel 14d hidden from view) of the appropriate size and shape to allow the applicator 10 to travel among row crops with minimal crop disturbance. As used herein, a "wheel" includes an inner, rigid wheel and an outer, flexible tire mounted on the wheel unless otherwise specified. Each wheel 14 may exhibit, for example, an outer diameter of between 60 inches (152 cm) and 85 inches (216 cm) and a width of between 10 inches (25.3 cm) and 25 inches (63.5 cm). More specifically, wheels 14 designed for use with row crops may exhibit an outer diameter of about 70 inches (178 cm) or about 80 inches (203 cm) and a width of about 15 inches (38.1 cm). Alternatively, the wheels 14 may exhibit a width of up to 25 inches (63.5 cm) (or more) for pre-emergent applications, for use on soft terrain, or both to maximize flotation and minimize soil compaction. Each of the wheels 14 may weigh between 600 pounds (272 kg) and 1,000 pounds (454 kg) and may specifically weigh about 700 pounds (318 kg) or about 800 pounds (363 kg). In one exemplary embodiment, each of the wheels 14 is about 70 inches (178 cm) tall, about 15 inches (38.1 cm) wide, and weighs about 700 pounds (318 kg).

The particular size, shape, and configuration of the wheels 14 may vary substantially from one embodiment to another. In some embodiments, the vehicle may include ground-engaging elements other than wheels, such as tracks, skis, etc. Hereinafter, reference will be made to a "wheel" or "wheels" with the understanding that the illustrated wheels 14 may be replaced with other types of ground-engaging elements.

One or more drive motors 26 (FIG. 2) may be associated with one or more of the wheels 14 for driving rotation of the wheel or wheels relative to the chassis 12 to propel the applicator 10 in forward and reverse directions. In the illustrated embodiment, a separate hydraulic motor 26 is drivingly connected to each wheel 14 such that each of the wheels 14 may be driven independently to propel the applicator 10. Either two or all four of the wheels 14 may be steerable. In some embodiments, the steering functionality of some of the wheels 14 may be selectively enabled and disabled. By way of example, the front wheels 14b, 14c may always be steerable, and supplemental steering provided by the rear wheels 14a, 14d may be selectively enabled and disabled. An operator may control the drive motors 26 and steering functions of the wheels 14, including enabling and disabling the steering ability of certain of the wheels 14, from one or more of the user interface elements of the cabin illustrated in FIG. 4.

The applicator 10 may include mechanisms for adjusting the track width of the wheels 14 to accommodate, for example, different spacing needs for row crops. In the illustrated embodiment, the applicator 10 includes telescoping axles with an outer axle 28 and an inner axle 30 associated with each wheel 14, wherein the inner axle 30 slidingly engages the outer axle 28 and allows the wheel 14 to shift laterally relative to the chassis 12. A hydraulic piston or similar actuator may drive the inner axle 30 inward and outward to shift the position of the wheel 14. The inner 30 and outer 28 axles form part of the chassis 12 and, in the illustrated embodiment, the outer axles 28 are rigidly connected to another portion of the chassis, such as one or more frame elements. U.S. Patent Application Publication 2020/0130741, "Mounting Assembly for a Steerable Wheel with Variable Track Width," published Apr. 30, 2020, discloses an example of a telescopic axle with an actuator disposed inside the outer axle and arranged to drive the inner axle inward and outward to shift the lateral position of the associated support assembly and wheel.

The application system 16 is supported on the chassis 12 and may be conventional in nature. In the illustrated embodiment, the application system 16 includes a liquid holding tank 32 and a delivery system 34 for applying a liquid from the holding tank 32 to a crop or field. The holding tank 32 may have a capacity of between 200 gallons (757 l) and 2,000 gallons (7,570 l) and, more specifically, may have a capacity of 700 gallons (2,650 l), 900 gallons (3,410 l), 1,100 gallons (4,160 l), or 1,300 gallons (4,920 l). The delivery system 34 includes a pair of booms 36 supporting hoses, pumps, and spray nozzles 35 or similar components for dispersing or otherwise applying the contents of the tank 32 to a crop. Alternatively, the application system 16 may be configured to apply dry material to a field and therefore may include a hopper and a mechanism for dispersing particulate material from the hopper, such as a pneumatic spreader or one or more spinners.

The operator cabin 18 or "cab" is supported on the chassis 12 and positioned forward of the application system 16. The cabin 18 presents a control environment 38 (FIG. 4) including a steering wheel 40, one or more pedals 42, a drive lever 44, one or more electronic instrument panels 46, and a control panel 48 including buttons, switches, levers, gauges, and/or other user interface elements. The various components of the control environment 38 enable the operator to control the functions of the applicator 10, including driving and operating the application system 16. The various user interface elements are positioned around and proximate a seat 50 for easy access by an operator during operation of the applicator 10. The control environment 38 may include a touchscreen display. One or both of the electronic instrument panels 46, for example, may be or include a touchscreen, or a display terminal with a touchscreen may be mounted on or near the control panel 48.

As mentioned above, the applicator 10 includes a support assembly 22 interposed between each of the wheels 14 and the chassis 12. Each support assembly 22 connects to a hub of one of the wheels 14 and to one of the inner axles 30 such that the wheel 14 and the support assembly 22 shift laterally as a single unit relative to the chassis 12 when the inner axle 30 is shifted relative to the outer axle 28 to adjust the applicator's track width. The support assemblies 22 include height adjustment components for raising and lowering the chassis 12 of the vehicle between various operating positions. One or more of the support assemblies 22 (or portions thereof) may be selectively pivotable relative to the chassis 12 to steer the applicator 10.

Each of the support assemblies 22 includes one or more actuators for adjusting a height of the chassis, for steering the associated wheel 14, or both. In some embodiments, the actuators are hydraulic actuators such as linear or rotary hydraulic actuators. FIG. 3A illustrates an exemplary hydraulic control system 52 for operating hydraulic actuator sections 54 (i.e., 54a, 54b, 54c, and 54d) in which a centralized hydraulic pump 56, driven by an internal combustion engine 58 or other power source, communicates pressurized hydraulic fluid to a hydraulic controller 60 that regulates fluid flow between the pump 56 and the hydraulic actuator sections 54 associated with the support assemblies via a plurality of hydraulic transfer lines 62. The hydraulic controller 60 may include, for example, a hydraulic manifold or similar device.

Each of the hydraulic transfer lines 62 communicates hydraulic power between the hydraulic controller 60 and one or more hydraulic actuator sections 54 and, thus, may include one or more hydraulic pressure lines and one or more hydraulic return lines. Each of the hydraulic transfer lines may communicate hydraulic power to more than one actuator, and each of the actuator sections 54 may include a group of actuators associated with each wheel 14 and/or support assembly 22. By way of example, a first actuator associated with the actuator section 54 may drive steering of the wheel 14, a second actuator may drive rotation of the wheel 14, and a third actuator may adjust a height of the chassis 12. It will be appreciated that the actuator sections 54 are exemplary in nature and that the various hydraulic actuators may not be grouped as described herein.

Figure 4:
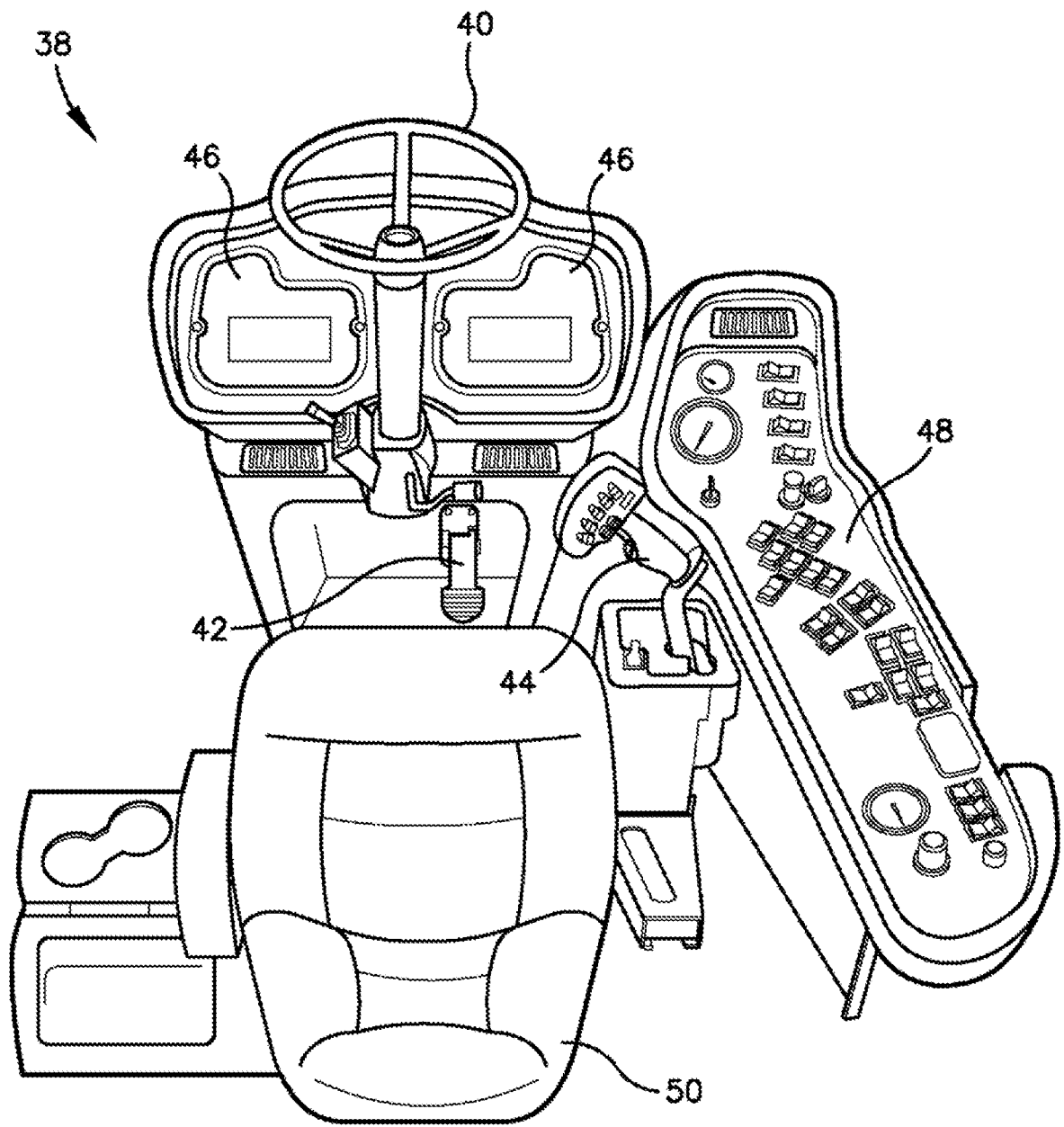
FIG. 4 illustrates certain features of a cabin of the applicator of FIG. 1 including one or more user interface elements allowing a user to control the applicator.
Figure 5:
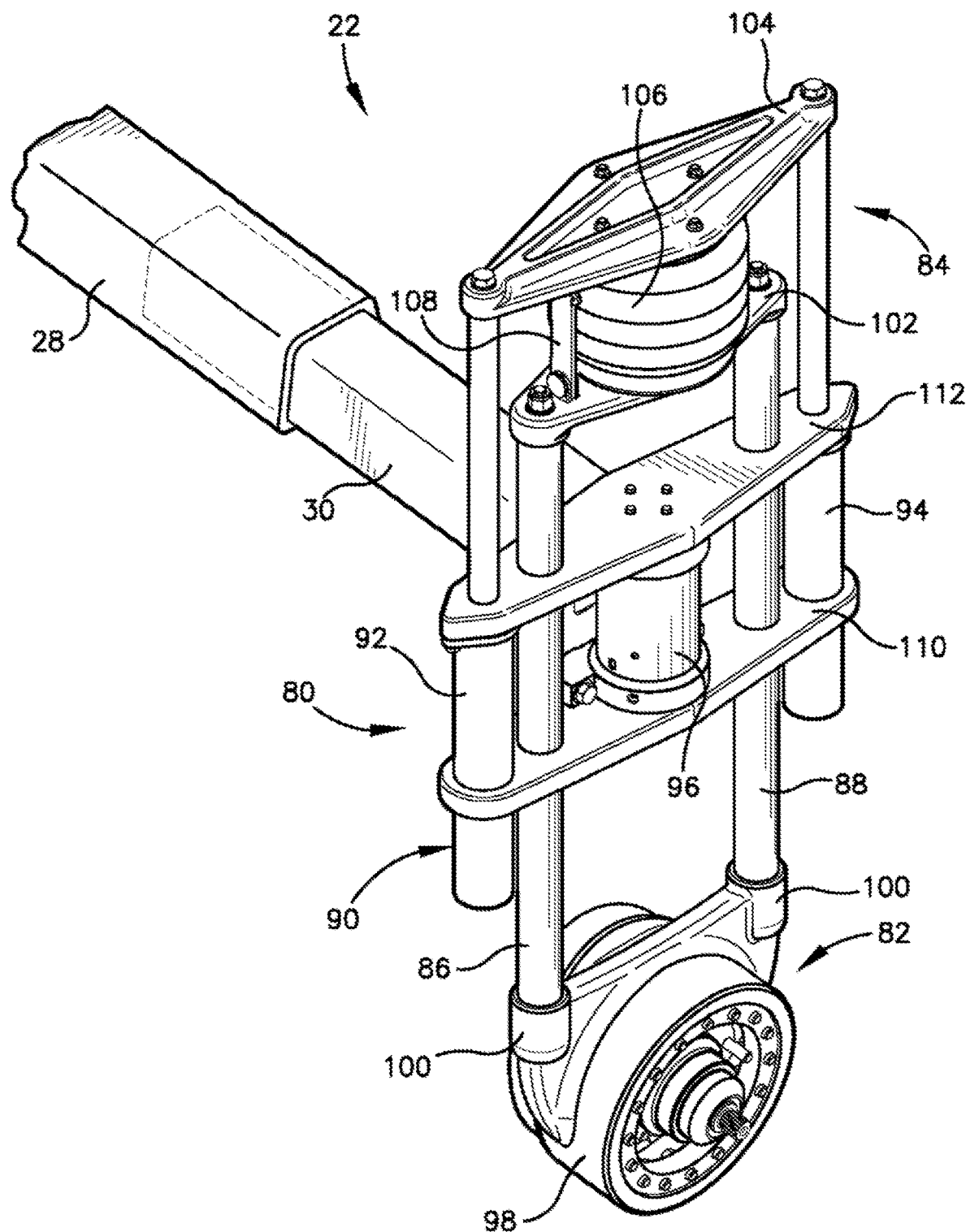
FIG. 5 is an outside perspective view of one of the support assemblies of the applicator of FIG. 2.
Figure 6:
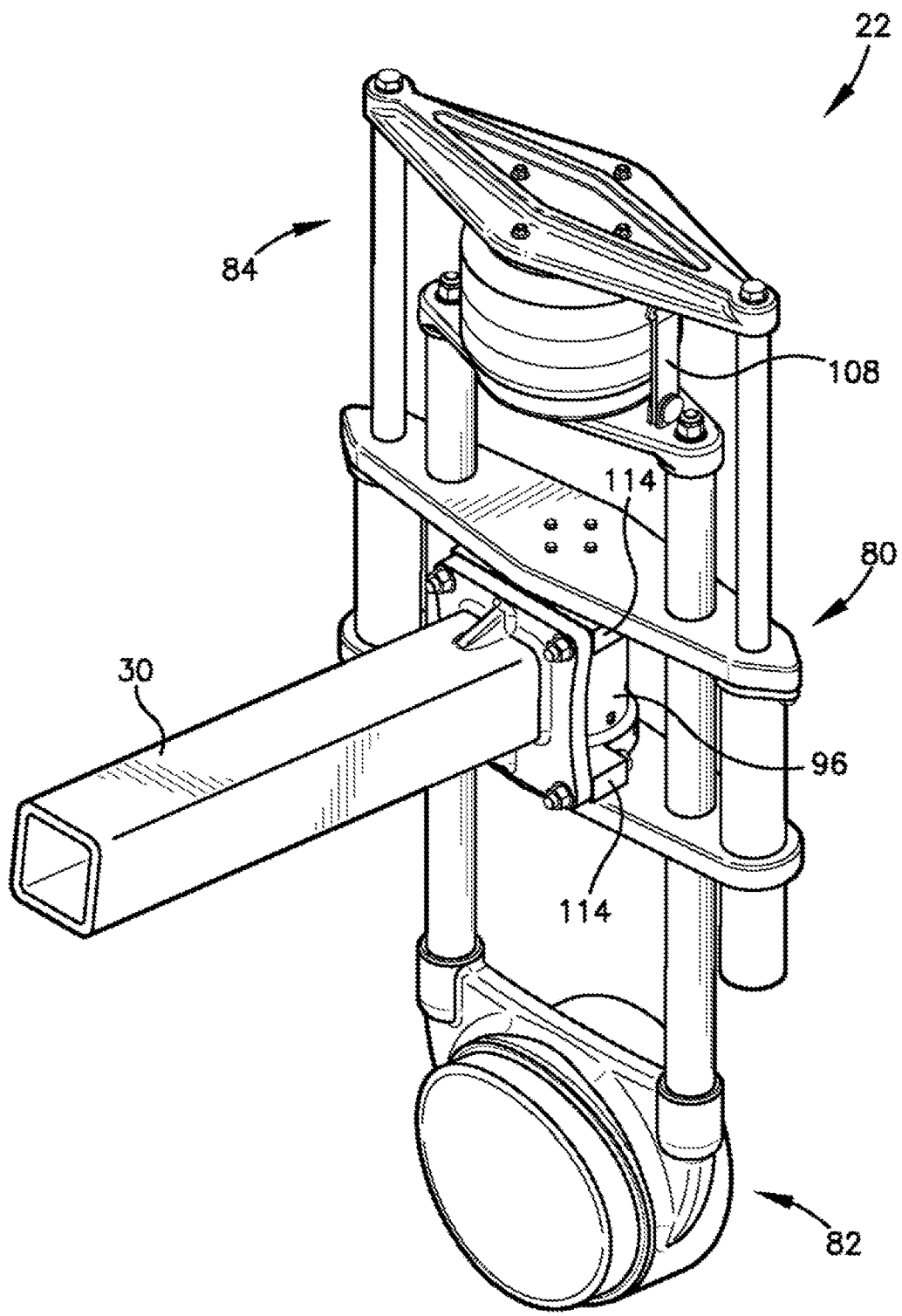
FIG. 6 is an inside perspective view of the support assembly of FIG. 5.
Figure 7:
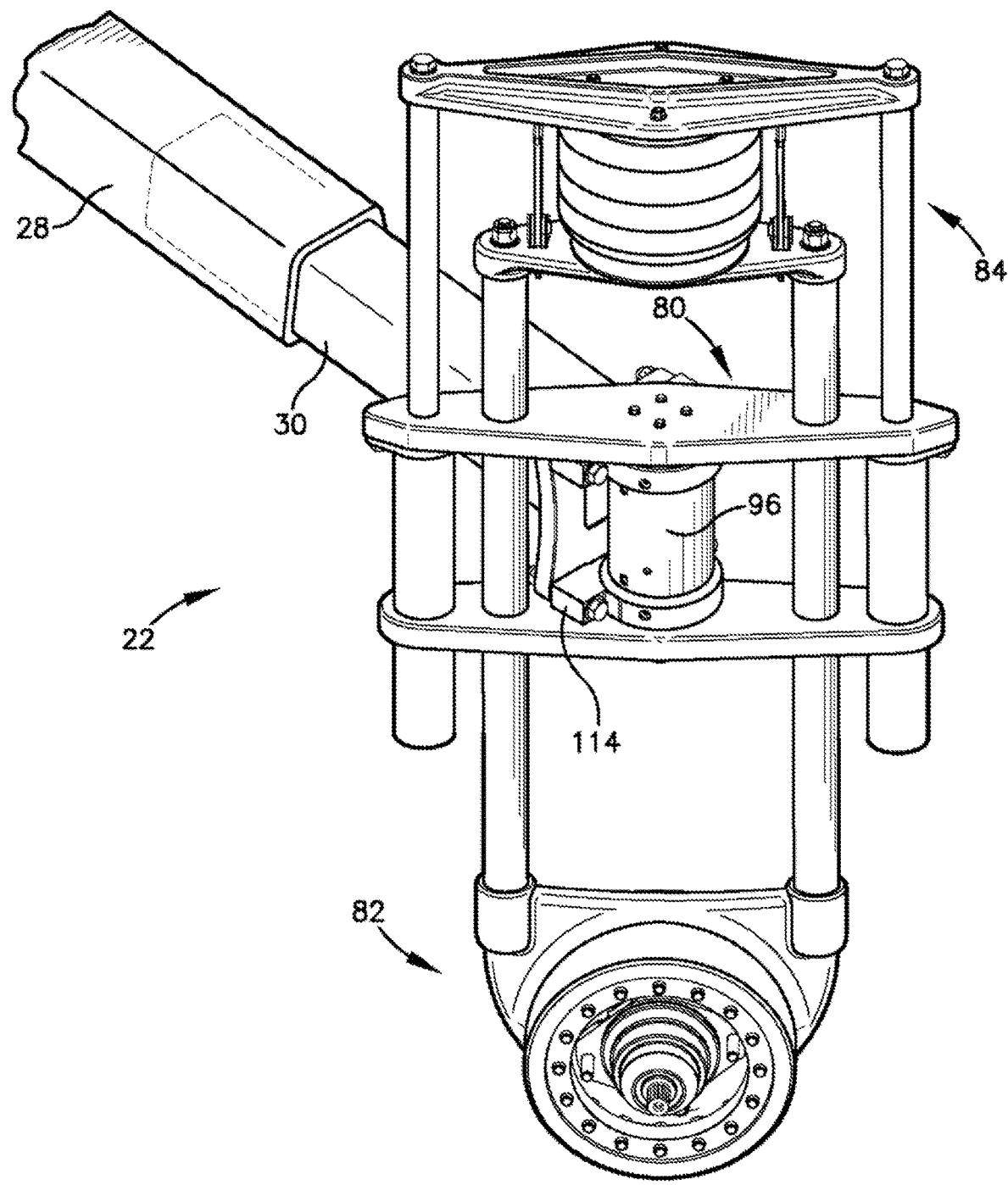
FIG. 7 illustrates the support assembly of FIG. 5 pivoted to a first position relative to an axle of the applicator.
Figure 8:
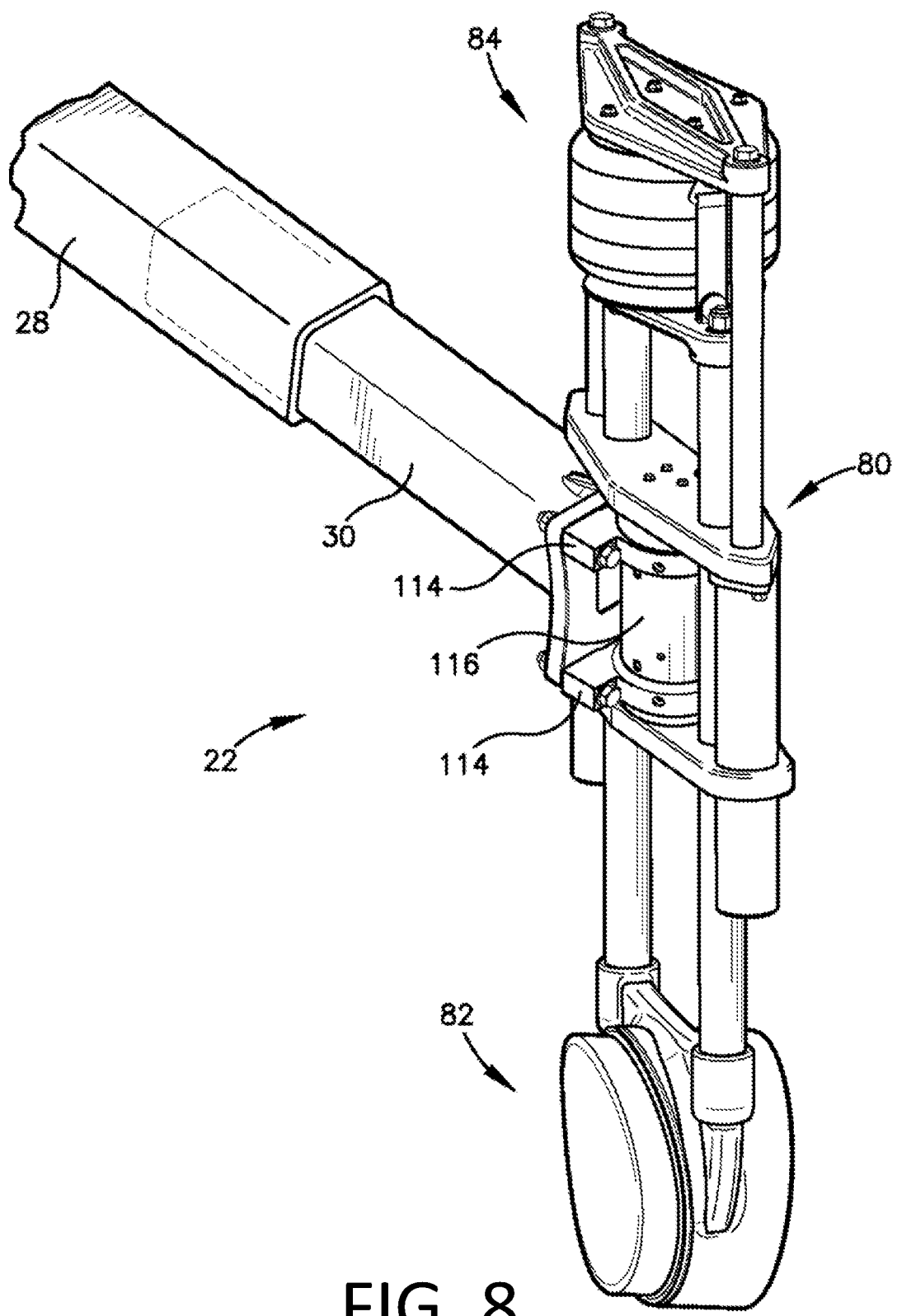
FIG. 8 illustrates the support assembly of FIG. 5 pivoted to a second position relative to the axle.
Figure 9:
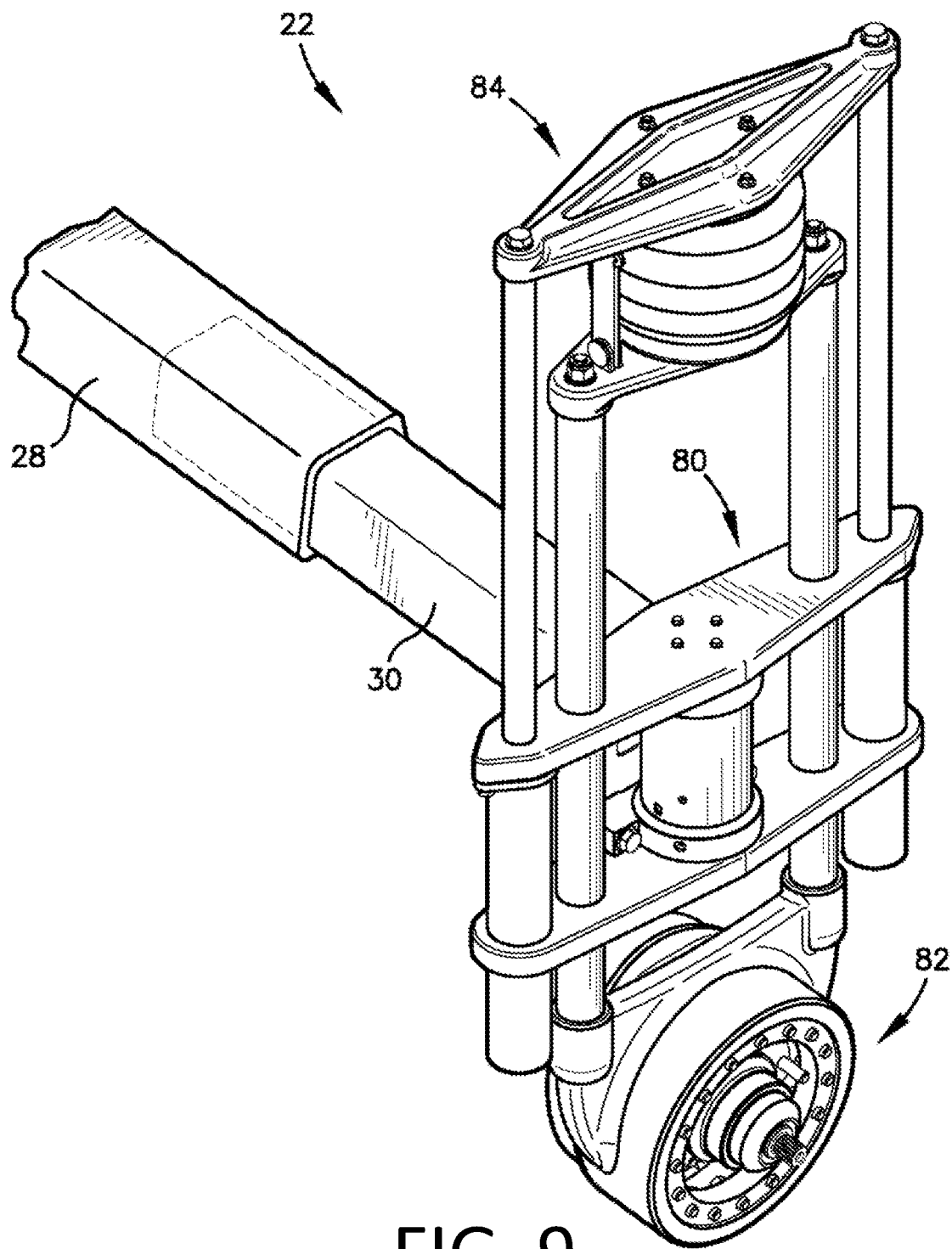
FIG. 9 illustrates the support assembly of FIG. 5 in a first operating position.

The system 52 includes a control interface 64 in communication with the hydraulic controller 60. The control interface 64 may be part of a user interface that includes one or more physical or virtual user interface elements 66, such as buttons, switches or dials, and may be part of the control environment 38 (FIG. 4).

Various different types of technology may be used to actuate the support assemblies 22. Though the actuators are illustrated and described herein as hydraulic actuators, it will be understood that other types of actuators may be used in place of, or in connection with, the hydraulic actuators. By way of example, electro-mechanical actuators may be used in place of at least some of the hydraulic actuators illustrated and discussed herein.

FIG. 3B illustrates another exemplary control system 68 similar to the system 52 but that includes a computerized controller 70 with a control module 72 for controlling the hydraulic controller 60. The system 68 may also include a wireless interface element 74 in wireless communication with the controller 60 for allowing a user to remotely control the actuator sections 54. The wireless interface element 74 may be a dedicated device, such as a device similar to a key-fob commonly used with cars and other vehicles, or a computing device such as smart phone, tablet computer, or wearable computing device programmed or configured for use with the system 68. The wireless interface element 74 may be configured to communicate with the hydraulic controller 60 and/or the computerized controller 70 via short-range wireless communications, such as Wi-Fi or Bluetooth, or via a communications network such as a cellular network.

The controller 70 may include one or more integrated circuits programmed or configured to control the hydraulic controller 60 to actuate the support assemblies 22. By way of example, the controller 70 may include one or more general purpose microprocessors or microcontrollers, programmable logic devices, or application specific integrated circuits. The controller 70 may also include one or more discrete and/or analog circuit components operating in conjunction with the one or more integrated circuits, and may include or have access to one or more memory or storage elements operable to store executable instructions, data, or both. The control module 72 may be a hardware or software module specifically dedicated to enabling the controller 70 to control the hydraulic controller 60 as described herein.

Another control system 76, illustrated in FIG. 3C, is similar to the system 68 but includes additional hydraulic circuit components, such as hydraulic accumulators 78. In some embodiments, each of the support assemblies 22 may include a single hydraulic actuator that both raises and lowers the chassis 12 and provides suspension functions, as explained below. Such hydraulic systems may require specialized hydraulic circuit components such as the hydraulic accumulators 78.

One of the support assemblies 22 is illustrated in greater detail in FIGS. 5 through 10. It should be understood that the support assembly 22 is one example, and many alternative constructions may be used instead. For example, U.S. Pat. No. 9,180,747, "System and Method of Adjusting the Chassis Height of a Machine," granted Nov. 10, 2015, discloses a number of different support assembly configurations that may be used.

The support assembly 22 broadly includes a chassis attachment component 80 for attaching to the vehicle chassis 12; a wheel attachment component 82 for attaching to a wheel 14 or other ground engaging element; a suspension component 84 operably interposed between the chassis attachment component 80 and the wheel attachment component 82 for regulating motion transfer between the two attachment components 80, 82; a plurality of strut bars 86, 88 connecting the wheel attachment component 82 to the suspension component 84; and a height-adjustment mechanism 90 comprising a plurality of height-adjustment actuators 92, 94 for shifting the wheel attachment component 82 between a plurality of operating positions relative to the chassis attachment component 80. The chassis attachment component 80 may include a pivot element 96 for allowing the support assembly 22 to pivot relative to the chassis 12, and a pivot actuator may drive the pivoting motion to steer a wheel or other ground engaging element connected to the wheel attachment component 82. In the illustrated embodiment, the pivot element 96 is or includes a rotary actuator.

The wheel attachment component 82 has a generally cylindrical body 98 and a pair of upwardly-opening receptacles 100 for receiving and connecting to the strut bars 86, 88. The receptacles 100 are positioned on opposite sides of and above the cylindrical body 98. Pivot torque is transferred to the wheel attachment component 82 by the strut bars 86, 88 via the receptacles 100. The wheel attachment component 82 includes a plurality of apertures or other features spaced angularly around the body 98 for connecting to a hub of a wheel, a hydraulic motor and/or a gear reduction hub, a caliper disc brake assembly, a parking brake assembly, and/or similar components.

The suspension component 84 includes a lower suspension member 102, an upper suspension member 104, and a pneumatic spring 106 or similar motion-regulating element positioned between and attached to the upper 102 and lower 104 suspension members. The upper suspension member 104 is connected to a top side or portion of the spring 106 and the lower suspension member 102 is connected to a lower side or portion of the spring 106. Each of the upper 104 and lower 102 suspension members has an elongated shape and includes a plurality of apertures or other features for attaching to the spring 106. The lower suspension member 102 includes apertures or other features located proximate end portions thereof to facilitate connection to the strut bars 86, 88, and the upper suspension member 104 includes apertures or other features located proximate outer portions thereof to facilitate connection to the adjustment mechanism 90. In the illustrated embodiment, the upper suspension member 104 is longer than the lower suspension member 102, enabling attachment to the height-adjustment actuators 92, 94 positioned outboard of the lower suspension member 102.

The pneumatic spring 106 uses trapped or compressed air or other fluid to regulate motion transfer between the chassis attachment component 80 and the wheel attachment component 82. The pneumatic spring 106 may contain air, water, nitrogen, antifreeze, or other fluid and may be single, double, or triple convolute. A pair of flexible straps 108 may be positioned on opposite sides of the spring 106 to limit extension of the spring and a bumper may be positioned inside or outside the spring to limit spring compression. Other mechanisms may be used in place of the pneumatic spring 106, including, for example, a coil-type compression spring, or a shock-absorbing cylinder and piston assembly.

The suspension components 84 of the assemblies 22 may be the only components of the applicator 10 configured to regulate vertical motion transfer between the wheels 14 (or other ground engaging element) and the chassis 12. The outer axles 28, for example, may be rigidly connected to portions of the frame of the applicator 10. Furthermore, the suspension components 84 regulate motion transfer between the wheels 14 and the chassis 12 regardless of the operating position of the assemblies 22. Thus, the suspension components 84 perform essentially the same function regardless of whether the chassis 21 is in a lowered position, a raised position, or somewhere in between.

The first strut bar 86 and the second strut bar 88 are rigidly connected to the receptacles 100 of the wheel attachment component 82 and are rigidly coupled with the suspension component 84 such that movement of the wheel attachment component 82 relative to the chassis attachment component 80 is communicated through the suspension component 84 via the strut bars 86, 88. More specifically, a first end of the first strut bar 86 is connected to a first receptacle 100 of the wheel attachment component 82, and a first end of the second strut bar 88 is connected to a second receptacle 100 of the wheel attachment component 82. A second end of the first strut bar 86 is connected to a first side of the lower suspension member 102, and a second end of the second strut bar 88 is connected to a second side of the lower suspension member 102. As explained above, the lower suspension member 102 is an elongated, rigid member with outer apertures on opposing ends thereof for connecting to the strut bars 86, 88 and one or more inner apertures between the outer apertures for rigidly attaching to a first side or portion of the spring 106. Thus, the lower suspension member 102 interconnects the spring 106 and the strut bars 86, 88.

The first and second strut bars 86, 88 are parallel or substantially parallel and are separated by a space. The strut bars 86, 88 slidingly engage the chassis attachment component 80 to allow the wheel attachment component 82 to move relative to the chassis attachment component 80 while also transferring pivot torque between the wheel attachment component 82 and the chassis attachment component 80.

The strut bars 86, 88 may be separated by a space of between about 3 inches (7.6 cm) and 20 inches (51 cm) and, more specifically, may be separated by a space of between about 8 inches (20 cm) and about 15 inches (38 cm). The length of each of the strut bars 86, 88 may be between about 12 inches (30 cm) and about 36 inches (91 cm) and, more specifically, between about 20 inches (51 cm) and about 30 inches (76 cm). The strut bars 86, 88 may be positioned symmetrically about a center of the wheel attachment component 82 and a center of the chassis attachment component 80.

The chassis attachment component 80 has a lower chassis attachment member 110 and an upper chassis attachment member 112 separated by a space. The pivot element 96 is interposed between, and rigidly connected to, the attachment members 110, 112. Each of the lower 110 and upper 112 chassis attachment members includes a pair of spaced through-holes in axial alignment for slidingly receiving the strut bars 86, 88. Each of the lower 110 and upper 112 chassis attachment members also includes a pair of apertures or other features positioned outboard of the through-holes for engaging the height-adjustment actuators 92, 94.

The chassis attachment component 80 is rigidly but adjustably coupled with the upper suspension member 104 via the height-adjustment actuators 92, 94 such that actuating the adjustment mechanism 90 causes the upper suspension member 104 to shift relative to the chassis attachment component 80, shifting the wheel attachment component 82 relative to the axle 30. The lower suspension member 102 is rigidly connected to the wheel attachment component 82 via the strut bars 86, 88, as explained above, such that motion transfer between the chassis attachment component 80 and the wheel attachment component 82 passes through, and is regulated by, the suspension component 84. Such motion transfer may correspond to up-and-down movement of the wheels 14 relative to the chassis 12 such that the suspension component 84 may provide a spring or shock-absorbing function and may, for example, dampen motion transfer between the wheels 14 and the chassis 12.

The height-adjustment mechanism 90, comprising the height-adjustment actuators 92, 94, is configured to shift the wheel attachment component 82 between a plurality of operating positions relative to the chassis attachment component 80. As used herein, an "operating position" is a selectable position of the wheel attachment component 82 relative to the chassis attachment component 80 in which the distance between the attachment components 80, 82 is rigidly or flexibly fixed. If the distance between the attachment components 80, 82 is flexibly fixed, the relative positions of the attachment components may fluctuate but will return to the same operating position. Stated differently, the average distance between the attachment components 80, 82 will remain approximately the same even though the instantaneous distance may fluctuate above and/or below the average distance. Fluctuations in the relative positions of the attachment components 80, 82 may result, for example, from operation of the suspension component 84, operation of a hydraulic component, or both.

Figure 10:
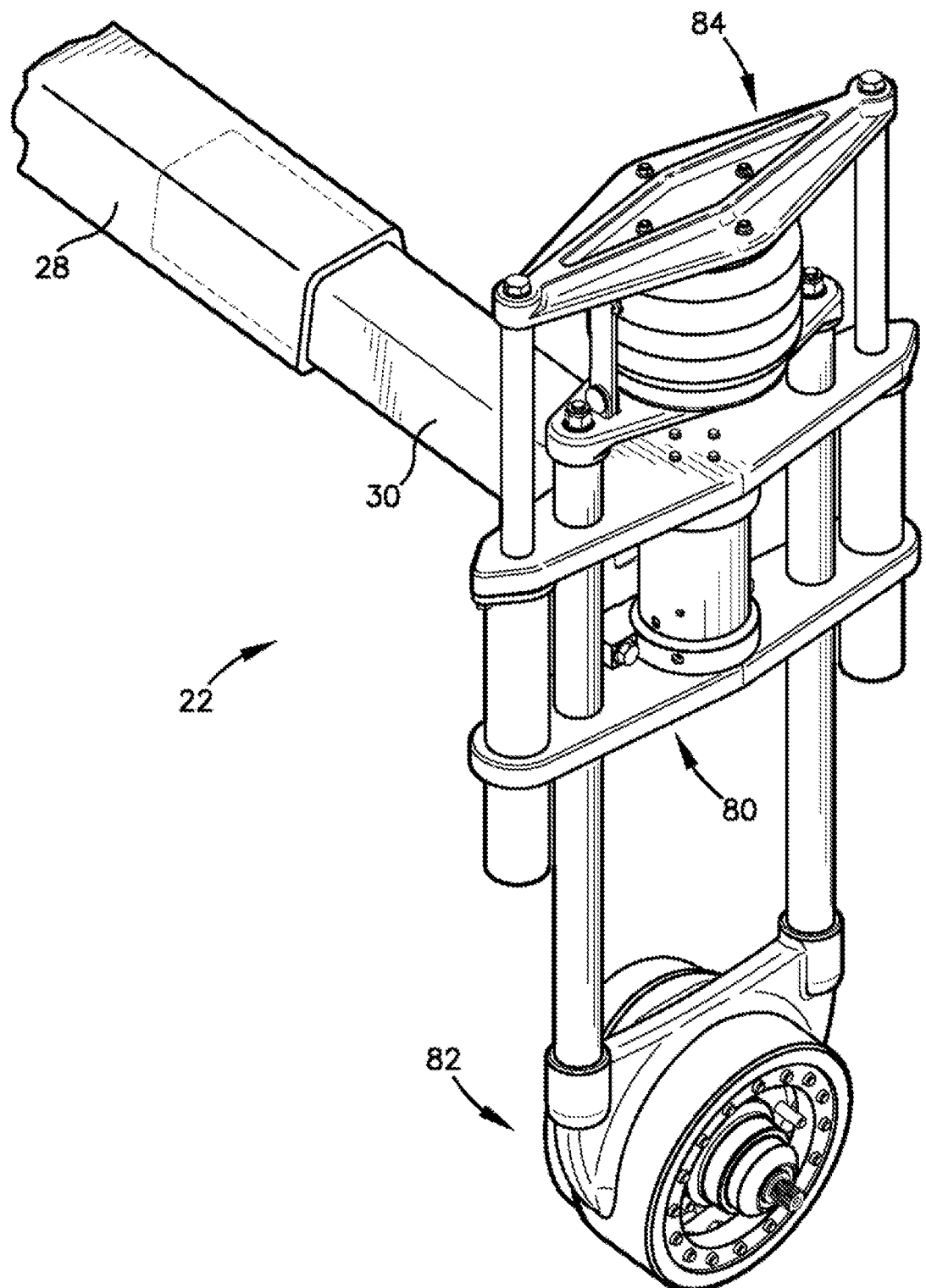
FIG. 10 illustrates the support assembly of FIG. 5 in a second operating position.

In operation, shifting the wheel attachment component 82 between operating positions relative to the chassis attachment component 80 will raise and lower the vehicle's chassis 12 between various operating positions relative to the ground surface. Each support assembly 22 is operable to shift between two or more operating positions, such as between two, three, four, five, six, seven, eight, nine, ten, twelve, fourteen, or sixteen operating positions. Additionally, each support assembly 22 may be infinitely adjustable between a first extreme operating position (FIG. 9) and a second extreme operating position (FIG. 10). The difference between the first extreme operating position and the second extreme operating position may be within the range of about 5 inches (13 cm) to about 50 inches (130 cm). More specifically, the difference may be about 10 inches (25 cm), about 20 inches (51 cm), about 30 inches (76 cm), or about 40 inches (102 cm).

As illustrated, the height-adjustment actuators 92, 94 are connected to the upper and lower chassis attachment members 110, 112 and to the upper suspension member 104, such that extending or retracting the height-adjustment actuators 92, 94 causes the upper suspension member 104 (and a top end or portion of the spring 106 to which it is connected) to shift up or down relative to the chassis attachment component 80. The height-adjustment actuators 92, 94 may include fluid actuators and/or electro-mechanical actuators. By way of example, the height-adjustment actuators 92, 94 may include hydraulic cylinders that drive piston rods between retracted and extended positions.

As used herein, the suspension component 84 is "operably interposed" between the wheel attachment component 82 and the chassis attachment component 80 if it regulates motion transfer between the two components 80, 82. Thus, the suspension component 84 need not be positioned physically between the attachment components 80, 82 in order to be operably interposed therebetween. As illustrated, the suspension component 84 may be positioned above (and in line with) both the wheel attachment component 82 and the chassis attachment component 80 and yet be operably interposed therebetween.

The support assembly 22 is configured to pivot relative to the axle 30 to pivot a wheel coupled with the wheel attachment component 82 and steer the applicator 10. The support assembly 22 may pivot between a first extreme position (FIG. 7) and a second extreme position (FIG. 8) about an axis of rotation passing through, and defined by, the pivot element 96. The extreme pivot positions may correspond to an angular separation of between, for example, about 90° and about 300°. The support assembly 22 pivots as a single unit such that the wheel attachment component 82, the chassis attachment component 80, and the suspension component 84 pivot in unison, regardless of the position of the wheel attachment component 82 relative to the chassis attachment component 80.

In the illustrated embodiment, the pivot element 96 attaches to an outer end of the axle 30, the suspension component 84 is positioned above the axle 30, and the wheel attachment component 82 is positioned below the axle 30 opposite the suspension component 84. Furthermore, the wheel attachment component 82, the chassis attachment component 80, and the suspension component 84 lie on a line that corresponds to, or is parallel with, the axis of rotation of the support assembly 22.

The pivot element 96 may include a rotatory hydraulic actuator connected to the axle 30 and to the lower 110 and upper 112 chassis attachment members. The rotary hydraulic actuator selectively drives pivoting movement of the support assembly 22 relative to the chassis 12, and may be controlled by a vehicle operator or an automated guidance system to steer the applicator 10.

By way of example, the rotary actuator may be a Helac L30 series helical hydraulic rotary actuator, available from Parker Hannifin, Cylinder Division, of Des Plaines, Illinois, or a similar device. A rotary hydraulic actuator is a device manufactured to drive or induce rotational movement in response to hydraulic input. Thus, a portion of the rotary actuator rotates relative to another portion of the rotary actuator and does not require external connections or components to generate rotational motion. A rotary actuator may be designed, for example, to internally translate linear motion into rotational motion. In one exemplary embodiment, the rotary hydraulic actuator may generate output torque of between 3,000 foot-pounds (4,070 N-m) and 32,000 foot-pounds (43,400 N-m) at a hydraulic pressure of between 2,000 psi (138 bar) and 4,000 psi (276 bar) or, more specifically, may generate torque of between 10,000 foot-pounds (13,600 N-m) and 25,000 foot-pounds (33,900 N-m) at a hydraulic pressure of between 2,000 psi (138 bar) and 4,000 psi (276 bar). The rotary actuator may have a total angular displacement of between about 90° and about 360°.

The illustrated rotary hydraulic actuator 96 includes a plurality of spaced mounting feet or flanges 114 for securing to the axle 30 or other part of the chassis 12 and a cylindrical housing 116 with opposing ends that mount to, and rotate, the lower and upper chassis attachment members 110, 112. In the illustrated embodiment, the mounting feet 114 are configured to attach to a plurality of attachment points arranged in a planar configuration, such as on a single planar surface. Thus, the rotary actuator 96 may function both to mount the chassis attachment component 80 to the axle 30 and to rotate the support assembly 22 relative to the axle 30 and, therefore, may simplify the design, manufacture, maintenance, and repair of the support assembly 22 and related components. The housing 116 may have a diameter of between about 5 inches (13 cm) and 12 inches (30 cm) and a length of between about 11 inches (28 cm) and about 40 inches (102 cm). The rotary actuator 116 and the connections between the rotary actuator 96 and the support assembly 22 and the axle 30 may be selected to be sufficiently strong to sustain the shock and rigors of routine use.

Rather than including a rotary actuator, the support assembly 22 may include, or may be coupled with, another type of actuator such as a linear hydraulic actuator for driving pivoting motion. Alternatively, the support assembly 22 may be configured to rigidly attach to the vehicle chassis 12 and not pivot relative to the chassis, wherein the chassis attachment component 80 is rigidly attached to the inner axle 30 or other portion of the chassis 12. This may be desirable, for example, when the support assembly 22 supports a ground engaging element that is not intended to steer the applicator 10. The chassis attachment component 80 may be rigidly attached to the axle 30 by replacing the pivot element 96 with a casting of the same size and shape as the pivot element 96 to rigidly connect to the chassis attachment component 80 and to the axle 30. The support assembly 22 may be configured to facilitate interchanging a rotary actuator configured to pivot the assembly and a static component configured to secure the assembly in a fixed position. Bolts or other easily removable attachment elements may be used to secure the rotary actuator 96 to the axle 30 and to the support assembly 22 and may be positioned to facilitate access thereto. Thus, an actuator and a fixed element may both be provided with each of the assemblies 22 such that a user may interchange the actuator and the fixed element as desired.

In operation, the assemblies 22 raise and lower the chassis of the applicator 10. More specifically, an operator may remotely control operation of the assemblies 22 to raise and lower the chassis 12 using, for example, one of the user interface elements forming part of the control environment 38 illustrated in FIG. 4. Thus, the operator may raise and lower the chassis 12 while seated in the cabin 18.

In one exemplary scenario, the operator fills the holding tank 32 at a central location, such as a local cooperative facility, and drives the applicator 10 to a field in a lowered operating position. Once at the field, the operator controls the assemblies 22 to raise the chassis 12 to a desired height to apply the product. The operator raises the chassis 12 while seated in the cabin 18. When the application is complete or before the applicator 10 returns to the cooperative for additional product, the operator lowers the chassis 12 and drives the applicator 10 to the cooperative or to another field. Adjusting the height of the chassis 12 allows for safer travel to and from the field by lowering the applicator's center of gravity and overall height.

In another exemplary scenario, the applicator 10 and a tender vehicle are taken to an area of application, such as a field or group of fields. The applicator 10 is placed in a lowered chassis position and prepared by filling it with liquid chemical or other product to be applied to a crop. The tender vehicle may be configured to interface with the applicator 10 only when the applicator 10 is in a lowered chassis position. When the applicator 10 is prepared, the operator may drive the applicator 10 to a starting position, raise the chassis 12 to a desired height using one or more interface elements within the cabin 18, and begin the application process. The operator refills the applicator 10 by returning to the tender vehicle, lowering the applicator chassis 12 to interface with the tender vehicle, then raising the chassis 12 after the applicator 10 has been refilled, to resume the application operation. When application for a first crop is complete, the applicator 10 may be used to apply a chemical to a second crop of a different height than the first crop. The operator may adjust the chassis height of the applicator 10 for application on the second crop, wherein a selected height for application on the second crop may be different than a selected height for application on the first crop.

The controller 60 or 70 may be configured to control the height of each support assembly 22 individually. Such control may enable certain benefits, such as to raise an individual wheel 14, or to transfer a load from one wheel 14 to others.

In one exemplary scenario, the applicator 10 is placed in a raised chassis position. The operator may provide a command to raise one of the wheels 14 (e.g., wheel 14b shown in FIG. 1) relative to the chassis 12 using one or more interface elements within the cabin 18. This may lift that wheel 14 off the ground, or may simply transfer a load from that wheel 14 to the other wheels 14. If the wheel 14 is lifted off the ground, the wheel 14 may be removed for service or replacement. In some embodiments, a jack stand or other support may be placed to support a portion of the chassis 12 while the wheel 14 is off the ground.

In certain conditions, at least one wheel 14 may be in a low-traction situation (e.g., the applicator 10 may be stuck in mud). The operator may transfer load from one wheel 14 (e.g., a wheel 14 with poor traction) to the others by adjusting the height-adjustment actuators 92, 94 to apply an upward force on the wheel 14 relative to the chassis 12. The chassis 12 may or may not change position relative to the ground as load is transferred to the other wheels 14, depending on the weight distribution of the applicator 10, the positions of the other wheels 14, or other factors. By transferring some or all of the load from one wheel 14 to the other wheels 14, the operator may be able to move the applicator 10 in a low-traction situation that might otherwise require towing or other measures.

Figure 11:
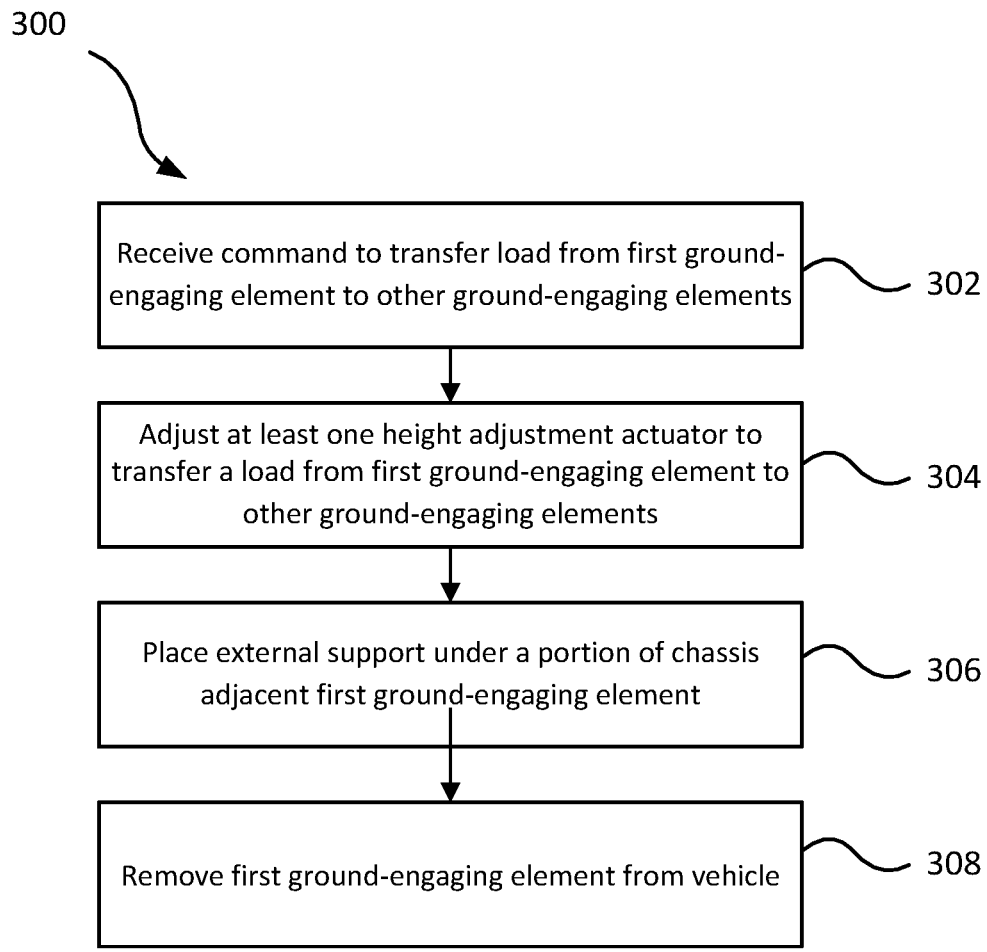
FIG. 11 is a simplified flow chart illustrating a method of operating an agricultural vehicle, such as the applicator shown in FIG. 1.

FIG. 11 is a simplified flow chart illustrating a method 300 of operating an agricultural machine such as the applicator 10. Block 302 represents receiving a command to transfer a load from a first ground-engaging element (e.g., a wheel 14) to other ground-engaging elements. The command may be based on an operator input, such as to initiate service (e.g., change a tire) or to overcome a low-traction condition (e.g., vehicle stuck in mud). The command may be received from an operator via interface elements within the cabin 18, or by another device (e.g., a mobile device via wireless link).

Block 304 represents adjusting at least one height-adjustment actuator to transfer a load from the first ground-engaging element to the other ground-engaging elements. The first ground-engaging element may be raised above the ground surface while the chassis is supported by the other ground-engaging elements. In some embodiments, a load may be transferred from a portion of the ground surface providing a first traction (e.g., low traction, at the area under the first ground-engaging element) to another portion of the ground surface providing a second traction greater than the first traction (e.g., at the areas under the other ground-engaging elements). Put another way, the load may be transferred from an area having a low coefficient of friction between the ground-engaging element and the ground, to an area having a higher coefficient of friction between ground-engaging elements and the ground.

In some embodiments, at least two of the height-adjustment actuators may extend to raise the chassis 12, which extension may be in unison or in sequence. The height-adjustment actuator corresponding to the first ground-engaging element may not move while the others extend. Alternatively, all of the height-adjustment actuators may first extend to raise the chassis relative to the ground, then the height-adjustment actuator corresponding to the first ground-engaging element may retract while the others do not move. In still other embodiments, the height-adjustment actuator corresponding to the first ground-engaging element may retract while the others extend. The actuators may move in any sequence that enables the height-adjustment actuator corresponding to the first ground-engaging element to be in a position to cause load transfer from the first ground-engaging element.

Block 306 represents placing an external support under a portion of the chassis adjacent the first ground-engaging element. Such an external support may be in the form of a block, a jack stand, or other support. In some embodiments, the support may be placed under the axle to keep the first ground-engaging element off the ground. In other embodiments, a support (e.g., a board) may be placed under the first ground-engaging element itself, such as to improve traction. In some embodiments, the control environment 38 may include a notification on a user interface instructing the operator to place the external support.

Block 308 represents removing the first ground-engaging element from the vehicle. Typically, this action is performed while the chassis is supported by the external support and the first ground-engaging element is suspended. In some embodiments, the control environment 38 may include a notification on a user interface instructing the operator to remove the first ground-engaging element.

Though depicted as a flow chart, the actions in FIG. 11 may be performed concurrently, and in some embodiments, some actions may be omitted.

Figure 12:
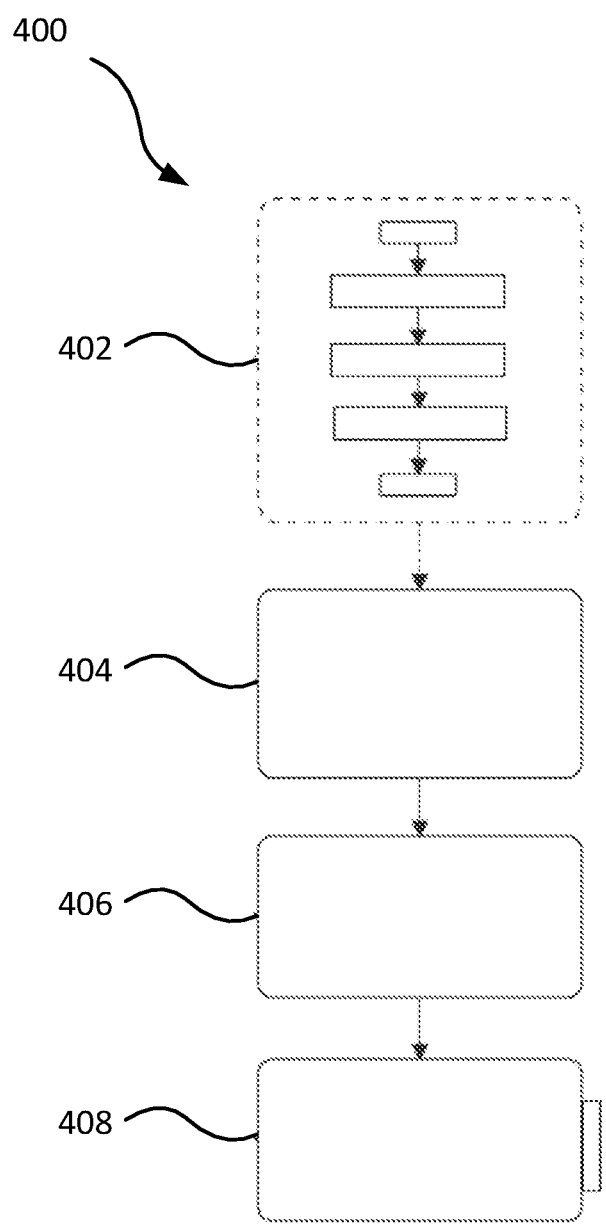
FIG. 12 illustrates an example computer-readable storage medium having processor-executable instructions configured to embody a method of operating an agricultural vehicle, such as the method illustrated in FIG. 11.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 12, wherein an implementation 400 includes a computer-readable storage medium 402 (e.g., a flash drive, CD-R, DVD-R, application-specific integrated circuit (ASIC), field-programmable gate array (FPGA), a platter of a hard disk drive, etc.), on which is computer-readable data 404. This computer-readable data 404 in turn includes a set of processor-executable instructions 406 configured to operate according to one or more of the principles set forth herein. In some embodiments, the processor-executable instructions 406 may be configured to cause a computer associated with the applicator 10 (FIG. 1) to perform operations 408 when executed via a processing unit, such as at least some of the example method 300 depicted in FIG. 3. In other embodiments, the processor-executable instructions 406 may be configured to implement a system, such as at least some of the example applicator 10 depicted in FIG. 11. That is, the control environment 38 may include or be connected to the implementation 400 of FIG. 12. Many such computer-readable media may be devised by those of ordinary skill in the art that are configured to operate in accordance with one or more of the techniques presented herein.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A method of operating an agricultural vehicle comprising a chassis, four ground-engaging elements configured to support the chassis above a ground surface, and four support assemblies supporting the chassis on the ground-engaging elements, wherein each support assembly comprises a height-adjustment actuator, each height-adjustment actuator configured to operate independently of other height-adjustment actuators, the method comprising:
   receiving a command to transfer a load from a first of the ground-engaging elements to second, third, and fourth ground-engaging elements;
   adjusting at least one of the height-adjustment actuators such that the first ground-engaging element is at a different height than the second, third, and fourth ground-engaging elements;
   transferring a load from a first portion of the ground surface providing a first traction at the first ground-engaging element to at least a second portion of the ground surface at at least one of the second, third, or fourth ground-engaging elements, the second portion of the ground surface providing a second traction greater than the first traction; and
   driving at least one of the second, third, and fourth ground-engaging elements while the load is carried by the second, third, and fourth ground-engaging elements.

2. The method of claim 1, wherein adjusting at least one of the height-adjustment actuators comprises raising the first ground-engaging element above the ground surface while the chassis is supported by the second, third, and fourth ground-engaging elements.

3. The method of claim 1, wherein adjusting at least one of the height-adjustment actuators comprises extending at least two of the height-adjustment actuators.

4. The method of claim 1, wherein adjusting at least one of the height-adjustment actuators comprises retracting the height-adjustment actuator corresponding to the first ground-engaging element.

5. The method of claim 1, wherein adjusting at least one of the height-adjustment actuators comprises:
extending each of the height-adjustment actuators to raise the chassis relative to the ground surface; and
retracting the height-adjustment actuator corresponding to the first ground-engaging element.

6. The method of claim 1, wherein adjusting at least one of the height-adjustment actuators comprises extending at least two of the height-adjustment actuators in unison while maintaining another of the height-adjustment actuators stationary.

7. An agricultural vehicle comprising:
a chassis;
four ground-engaging elements configured to support the chassis above a ground surface;
four support assemblies supporting the chassis on the ground-engaging elements, each support assembly comprising a height-adjustment actuator, each height-adjustment actuator configured to operate independently of other height-adjustment actuators; and
a controller configured to:
adjust the height-adjustment actuators independently of one another such that a first of the ground-engaging elements is at a different height than second, third, and fourth ground-engaging elements;
transfer a load from a portion of the ground surface providing a first traction at the first ground-engaging element to at least a second portion of the ground surface at at least one of the second, third, and fourth ground-engaging elements, the second portion of the ground surface providing a second traction greater than the first traction; and
drive at least one of the second, third, and fourth ground-engaging elements while the load is carried by the second, third, and fourth ground-engaging elements.

8. The vehicle of claim 7, further comprising:
a liquid holding tank carried by the chassis; and
a plurality of nozzles spaced along a transversely extending applicator boom carried by the chassis, wherein the nozzles are configured to deliver fluid from the liquid holding tank to the ground surface.

9. The vehicle of claim 7, wherein the height-adjustment actuators comprise hydraulic cylinders that are each connected to a common fluid source via a respective control valve.

10. The vehicle of claim 7, further comprising a user interface for allowing a user to send a command to the controller, the controller configured to automatically actuate at least one of the height-adjustment actuators and transfer the load from the first ground-engaging element after receiving the command from the user.

11. The vehicle of claim 7, wherein the controller is configured to adjust a plurality of the height-adjustment actuators while at least one of the height-adjustment actuators remains stationary.

* * * * *